Feb. 22, 1966 R. ADLER 3,237,114

CROSSED-FIELD TYPE OF PARAMETRIC AMPLIFIER WITH INHOMOGENOUS PUMP FIELD

Filed July 8, 1959 2 Sheets-Sheet 1

INVENTOR
Robert Adler
BY Francis W. Crotty
ATTORNEY

Feb. 22, 1966 R. ADLER 3,237,114

CROSSED-FIELD TYPE OF PARAMETRIC AMPLIFIER WITH INHOMOGENOUS PUMP FIELD

Filed July 8, 1959 2 Sheets-Sheet 2

INVENTOR
Robert Adler
BY Francis W. Crotty
ATTORNEY

United States Patent Office 3,237,114

Patented Feb. 22, 1966

3,237,114
CROSSED-FIELD TYPE OF PARAMETRIC AMPLIFIER WITH INHOMOGENOUS PUMP FIELD

Robert Adler, Northfield, Ill., assignor to Zenith Radio Corporation, a corporation of Delaware Filed July 8, 1959, Ser. No. 825,715
11 Claims. (Cl. 330—4.7)

The present invention pertains, in general, to parametric amplifiers and is especially directed to parametric amplifiers of the crossed-field type, that is, amplifiers employing mutually perpendicular magnetic and electric fields.

In a copending application of Robert Adler, Serial No. 738,546, filed May 28, 1958, and assigned to the assignee of the present invention, there is a general discussion of parametric amplifying systems and a recognition that they may employ transverse or longitudinal field effects. Particular emphasis is there placed on the structure of transverse-mode parametric amplifying tube arrangements.

In such a structure, an electron beam is developed and directed along a path with which there is associated an input coupling device, a modulation expander and an output coupling device arranged in the recited order. Additionally a solenoid, positioned coaxially of the beam path and enclosing the couplers as well as the modulation expander, causes the entire beam to be immersed in a uniform magnetic field. The input coupler deflection-modulates the beam with a fast wave corresponding to a signal desired to be amplified and supplied from a source to the coupler. The modulation effects orbital electron motion in the beam representing the applied signal and this motion is increased in amplitude within the modulation expander to accomplish signal amplification. The output coupler extracts the amplified signal from the beam for application to a load associated with the output coupler.

This structure has many highly desirable attributes including particularly a most attractive noise figure. Its greatly improved noise properties stem from a second function of the input coupler which is explained in detail in the Adler application. Suffice it here to say that the coupler, in addition to impressing the signal upon the beam, demodulates the beam as far as the fast wave components of beam noise are concerned, stripping as it were such components from the beam so that the beam, as it leaves this coupler conveys essentially only the desired signal. The device is also highly attractive from the standpoint of its amplification and bandwidth properties. However, it would be desirable at least for certain installations to avoid the need for the solenoid and its energizing source. In theory, at least, it would be possible to replace the solenoid by a permanent magnet but it is not practicable to make use of a permanent magnet in establishing a magnetic field parallel to the beam path; certainly this would be a highly inefficient magnetic structure.

It has been determined that this difficulty may be avoided by an amplifier arrangement featuring crossed fields because it is entirely feasible, as will be explained hereinafter, to provide a magnetic structure for developing a homogeneous unidirectional field across, as distinguished from parallel to, the path of beam travel. Moreover, such an approach permits the attainment of intense transverse magnetic fields as required for the amplification of high frequencies.

It is an object of the invention to provide a novel parametric amplifier featuring crossed homogeneous and unidirectional electric and magnetic fields suitable for amplifying high frequency signals.

Another particular object of the invention is the provision of an improved modulation expander for use in a parametric amplifier of the crossed field-type.

A crossed-field type of parametric amplifier, embodying the present invention, comprises means for directing an electron beam along a predetermined path. There are means for establishing a homogeneous unidirectional magnetic field across that path and further means for establishing a homogeneous unidirectional electric field perpendicular to the magnetic field to develop in conjunction therewith a crossed-field condition along the path. Coupling means are disposed at one position along the path for coupling a signal source to the beam to develop cycloidal electron motion in the beam representing an applied signal, said cycloidal motion having a cyclotron wave component lying in a plane including said path. A modulation expander, disposed in a second position further along the path, subjects the electrons to a periodic inhomogeneous field the inhomogeneous change of which is in a direction substantially perpendicular to said path and the periodicity of which has a phase relationship to said cyclotron wave component to enable the delivery of energy thereto in proportion to the amplitude of said component. Finally, output coupling means are disposed at a third position, still further along the beam path than the modulation expander, for extracting from the beam energy corresponding to the amplified signal.

The features of this invention which are believed to be new are hereinafter set forth with particularity in the appended claims. The invention, together with further objects and advantages thereof, may best be understood however by reference to the following description in conjunction with the accompanying drawings in the several figures of which like reference numerals indicate like elements and in which:

Figures 1, 2, 3:
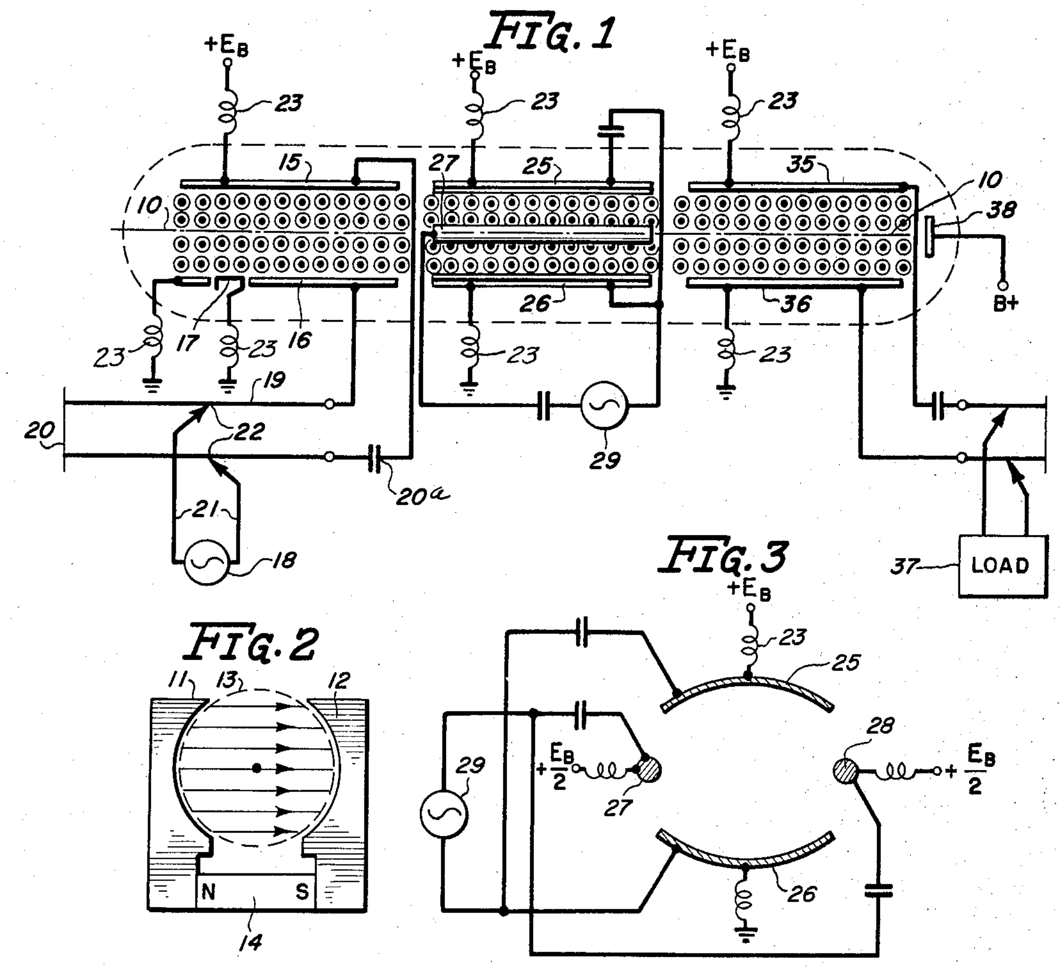
FIGURE 1 is a schematic representation of a crossed-field parametric amplifier constructed in accordance with the invention.
FIGURES 2 and 3 represent certain structural details of the amplifier.

Referring now more particularly to FIGURE 1, the crossed-field type of parametric amplifier there represented has a beam path 10, 10 along which a strip or ribbon type of electron beam is to be directed from a source presently to be described. The field environment of the beam is distinguished from that of the transverse and longitudinal-mode devices by having crossed homogeneous unidirectional magnetic and electric fields. The magnetic field extends across the beam path, being directed in a plane perpendicular to the plane of the drawing and being represented in the conventional manner of a dot within a circle. The means for developing the magnetic field is represented in FIGURE 2 and includes a pair of elongated pole pieces 11, 12 disposed on opposite sides of beam path 10 and extending throughout the entirety of that path. Of course, the structure under consideration is a tube having an enclosing envelope 13 and while the magnetic structure may be enclosed therewithin, it is more convenient to arrange the pole pieces outside of and in close association with the tube envelope as by contouring or shaping of the pole pieces in the manner represented. An energizing permanent magnet 14 is connected to the pole pieces and results in a uniform transverse magnetic field as represented in the usual way in FIGURE 2.

The means for establishing a homogeneous unidirectional electric field across the beam path and in space quadrature relation to the magnetic field comprises an electrode system having first, second and third portions disposed at first, second and third successive positions respectively along the beam path. These several portions of the electrode system have double functions as will be apparent presently but considered from the standpoint of electrodes for developing the desired electric field they may be considered as three pairs of plates or electrodes designated 15–16, 25–26, and 35–36. Each pair of plates is symmetrically disposed with respect to beam path 10, 10 and the separation between successive pairs in the axial direction is as small as operating conditions will permit in order that there may be the least non-uniformity of the electric field introduced by the discontinuities represented by the spacing between the pairs of plates. If desired, the gap between successive pairs of the plates or electrodes may be bridged in a manner to be described in connection with FIGURE 5 further to minimize non-uniformities of the electric field. A D.C. potential is applied across each pair of electrodes to establish the electric field which, in conjunction with the magnetic field, provides the desired crossed-field condition along the beam path. More specifically, the sole plate of each pair is grounded through an RF choke 23 and the companion plate is connected to a potential source designated $+E_B$, likewise through an RF choke.

Sole plate 16 of the first pair of electrodes is interrupted to receive a cathode 17 constituting means for developing an electron beam of the strip or ribbon type. This may be a cathode structure of the type conventionally employed in so called M-type growing-wave tubes of which the traveling-wave magnetron is a more familiar example.

It is well understood from studies of the movement of charged particles in fields that an electron injected into crossed homogeneous magnetic and electric fields traverses a generally cycloidal path having both transverse and longitudinal components of motion. Consequently, an input coupler by means of which a signal is to be impressed upon the beam may be of the transverse or longitudinal type or may represent a combination thereof. For the embodiment under consideration, a transverse-mode input coupler is employed as means for coupling a signal source to the beam to develop cycloidal electron motion in the beam representing an applied signal.

More particularly, the electrode pair 15, 16 functions as a lumped input coupler in addition to serving as a portion of the electrode system relied upon to establish the requisite electric field. Lumped coupling devices of this type are most useful for operating conditions in which the signal frequency corresponds to the electron resonance or cyclotron frequency established by the magnetic field because, as explained in the Adler application, such operating conditions result in the establishment of a signal wave on the beam of infinite phase velocity.

The signal to be amplified is developed in a source 18. For coupling that source to the input coupler, a transmission line 19 having one end 20 short-circuited is coupled at its opposite end to deflector plates 15, 16, condenser **20*a* serving to isolate the D.C. supply. A transmission link 21 is tapped as indicated at 22 onto transmission line 19 in a position adjusted to match the impedance of source 18 to that represented by the deflectors. Transmission line 19 has an effective electrical length of one-fourth wave length at the frequency of the signal of source 18**.

Amplification is attained in a parametric type of amplifier by means of a modulation expander for expanding the signal modulation of the beam. The modulation expander serves as means for subjecting the electrons of the beam to a time-variable non-homogeneous field to increase the amplitude of their cycloidal motion. It may take the form of a quadrupole electrode structure arranged with the axis of the quadrupole extending along the beam path. This type of expander is represented in FIGURES 1 and 3. Two of its electrodes 25 and 26 have a double function in that a D.C. potential is applied thereacross to establish a D.C. electric field throughout the quadrupole structure. The companion pair of quadrupole electrodes 27, 28 are two conductive rods arranged parallel to one another in a plane that is perpendicular to the median plane of the first-mentioned pair of electrodes. They are established D.C.-wise at the same potential and at a level which is half of the potential difference of deflector 25 relative to its companion deflector 26. Preferably, deflectors 25 and 26 are bowed as indicated to the end that the D.C. electric field of the quadrupole structure is essentially uniform or homogeneous throughout the region of the structure through which the electron beam passes.

Energy from which signal amplification is eventually derived is supplied by means of a driving or pumping signal generator 29. One terminal of generator 29 connects to deflector pair 27, 28 and the opposite terminal thereof connects to the remaining electrode pair 25, 26. Preferably, the electrodes of the quadrupole are constructed of non-magnetic material so as not to interfere with the homogeneous magnetic field. A quadrupole type of modulation expander is the subject of a copending application of Glen Wade, Serial No. 747,764, filed July 10, 1958, now abandoned in favor of continuation application Serial No. 289,792, filed June 20, 1963, both assigned to the assignee of the present invention. It is also described in an article entitled A Low Noise Electron Beam Parametric Amplifier by Robert Adler, George Hrbek and Glen Wade, published in "Proceedings of the IRE," Volume 46, No. 10 under date of October, 1958. As explained in the application and in the article, the non-homogeneous field developed by the quadrupole has an intensity which varies linearly, increasing with increasing distance from the center of the structure through which the beam path preferably extends.

Beyond the modulation expander there is an output coupler for extracting from the beam the amplified signal energy. It is in all material respects the same as the input coupler, having a pair of deflector plates concurrently serving as the final portion of the electrode structure relied upon for developing the electric field of the amplifier. It is coupled to a load 37 through the same type of coupling structure as employed in associating signal source 18 to input coupler 15, 16.

Finally, the amplifier has a collector 38 for collecting the electrons of the beam. This will be of generally the same construction as the collector electrode conventionally employed in a magnetron.

Figure 4:
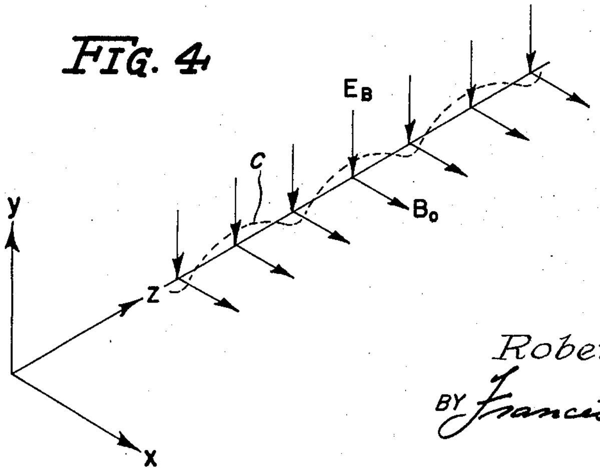
FIGURE 4 shows the magnetic and electric field relations as well as the cycloidal electron motion characteristic of the amplifier.

In considering the operation of the device, it will be assumed initially that no signal is applied from source 18 to input coupler 15, 16. For the assumed condition, the fields into which electrons of the beam are injected have the relationship represented in FIGURE 4. There is a uniform magnetic field $B_0$ extending in the X direction and a uniform electric field $E_B$ extending in the Y direction. The injected electrons have a forward component of travel in the +Z direction and their injection velocity is so chosen, in relation to the ratio of the electric to magnetic field, that, for the assumed no-signal condition, the electrons follow a substantially linear path through the crossed field region of the tube to collector 38. The application to input coupler 15, 16 of the signal to be amplified, in effect, establishes a transverse dipole field across beam path 10, 10 and deflection modulates the beam accordingly. This gives rise to a circular motion of the electrons in the YZ plane at the cyclotron frequency, superimposed on their linear motion along the Z axis. Thus, the composite motion of the electrons in the presence of a signal supplied from source 18 is essentially that of a prolate or stretched out cycloid and is represented by the broken-line curve C of FIGURE 4. In other words, the electric field of input coupler 15, 16 is modulated by the signal to be amplified whereby that signal is impressed on the electron beam traveling path 10, 10. It results in the development of an electron wave representing the applied signal; the phase velocity of the electron wave is infinite because the cyclotron frequency has been chosen to be equal to the signal frequency.

Were the signal modulated beam to traverse a drift space and then enter output coupler 35, 36, the signal carried by the beam would be surrendered through the output coupler to load 37, utilizing the bi-directional signal translating properties of the interaction of the beam and couplers but no amplification will have been experienced. However, modulation expander 25–28 interposed between input coupler 15, 16 and output coupler 35, 36 subjects the electrons of the beam to a non-homogeneous field which varies in time periodically in accordance with the frequency of the pumping or driving signal from source 29 for the purpose of increasing the amplitude of their cycloidal motion and thus accomplishing amplification. As explained in the above-identified article and in the Wade application, the quadrupole modulation expander has non-homogeneous field components in both the X and Y planes, for the case where the quadrupole is coaxial with the beam path along the Z axis. Of these, only the Y component is effective; it increases the transverse component of motion of the electrons as required to increase the amplitude of their cycloidal motion and amplifies the signal represented by that motion. In other words, amplification is achieved in the usual manner of the quadrupole modulation expander described in the references although only half of its pumping capabilities are employed because of the motion components of the electrons. Accordingly, the electron beam as it traverses output coupler 35, 36 delivers an amplified signal to load 37.

Of course, the described amplifier exhibits the same improvement in respect of noise as the amplifying systems described in the above-identified Adler application. In both instances advantage is taken of the capabilities of the interaction of the couplers and the electron beam in modulating the beam with a signal to be amplified while concurrently purging the beam of fast-wave noise components carried on the beam as it enters the field of the input coupler.

A higher degree of amplification may be achieved by a specifically different orientation of the quadrupole modulation expander relative to the beam path. In particular if the structure were positioned such that its quadrupole axis is parallel to the X axis, both coordinates of the non-homogeneous pumping field would contribute to expanding the electron motion and to gain as explained hereinafter.

Figure 5:
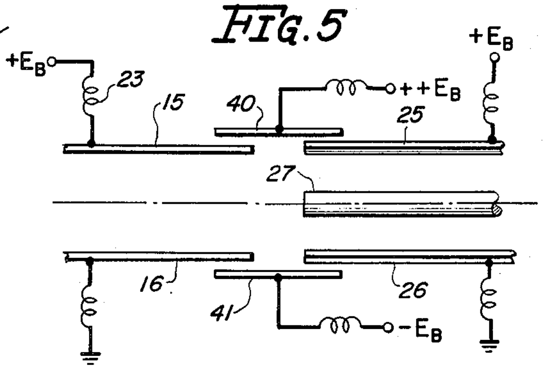

As suggested above, the structure of FIGURE 5 may be employed to avoid discontinuities of the electric field otherwise associated with the physical separation of the successive portions of the field structure serving as the input coupler, modulation expander and output coupler. By way of illustration, an auxiliary pair of plates 40, 41, in effect, overlap the gap defined by the contiguous ends of deflection plates 15, 16 serving as the input coupler and plates 25, 26 as the electrode pair of the quadrupole. The D.C. potential applied to the auxiliary pair of deflectors is represented by the legend $++E_B$ and $-E_B$ which denotes that the potential difference is adjusted relative to that established across deflectors 15, 16 and 25, 26 so that the electric field is homogeneous or uniform all along the beam path.

It has been convenient to consider a special case in which the frequency of the signal to be amplified is the same as the electron resonance or cyclotron frequency established by the magnetic field $B_0$ but this is no operating limitation on the structure. As explained in the Adler application, for different relative values of the signal and cyclotron frequencies, the signal wave developed on the electron beam is a fast wave moving in either the forward or backward direction where forward connotes travel toward the final collector 8 and backward is the obverse direction. The fast wave then has a finite phase velocity and coupling to the beam for these operating conditions may be accomplished by the use of distributed as distinguished from lumped coupling structures. Furthermore, since the electron motions within the tube are half transverse and half longitudinal, coupling to the beam may be by means of transverse or longitudinal-mode couplers or combinations thereof.

Figure 6:
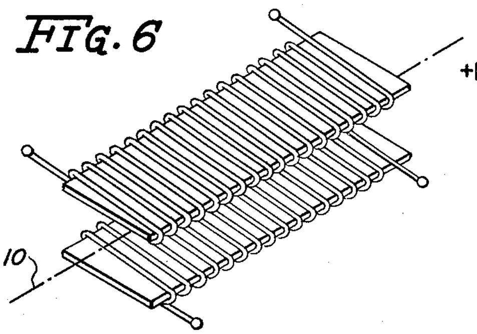
FIGURES 5 and 6 represent further structural details that may be employed in the amplifier.

FIGURE 6 represents the use of transmission line sections for the input coupler. Although the line sections may take any of a variety of forms a pair of flat helices have been shown, positioned on opposite sides of the beam path in place of lumped coupler deflector plates 15, 16. The two helices combine to form a transmission line section for transverse fields which has a propagation velocity substantially equal to the phase velocity of the fast electron wave and the coupling arrangement of FIGURE 1 may be employed to energize the transverse helix pair in push-pull from signal source 18. In this case, the transmission line sections are connected across a source of D.C. voltage in order that they may also serve to establish the electric field throughout the region of the input and output coupler sections.

Figure 7:
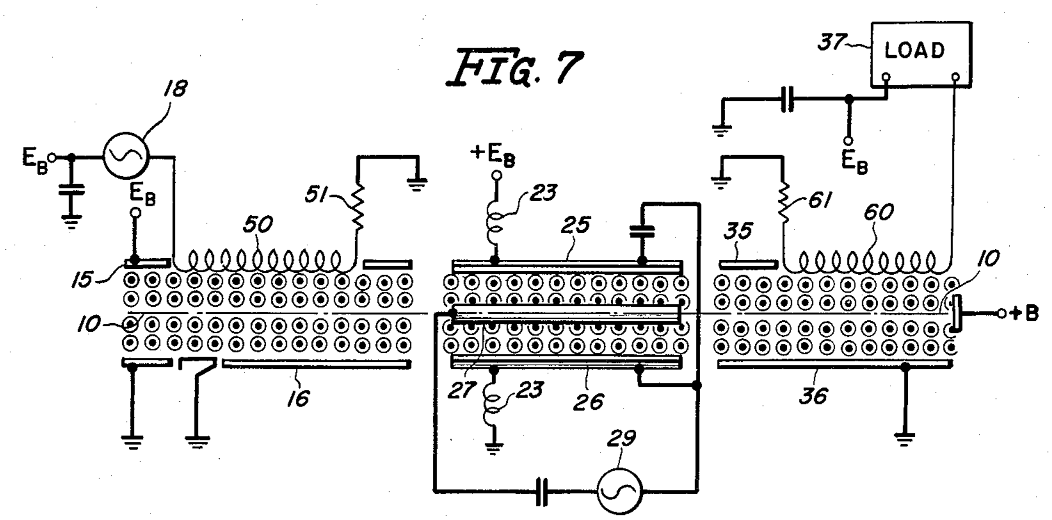
FIGURE 7 is a schematic representation of another form of a crossed-field parametric amplifier.

The arrangement of FIGURE 7 is essentially the same as that of FIGURE 1, differing primarily in that longitudinal couplers are employed at both the input and output. One such coupler 50 is shown at the input, positioned on one side of the beam path and coupled at one end to signal source 18. Its opposite end is terminated in a resistor 51. It is preferred that this transmission line section be terminated in its characteristic impedance at both ends to avoid reflection effects. A longitudinal helix 60 of the output coupler is essentially the same and is likewise properly terminated by an impedance 61 at its input and by the load 37 at its output end. Each longitudinal helix in conjunction with the associated sole plate 16–36 establishes the D.C. electric field in the region of the coupler. If desired, segments of the companion plates 15 and 35 of each pair 15, 16 and 35, 36 may also be used as illustrated to extend this field in the coupling regions of the tube structure.

Figure 8:
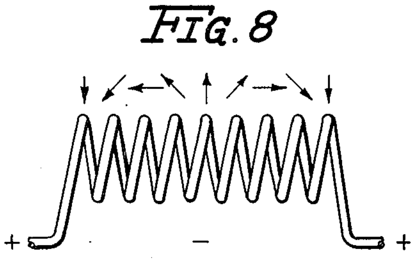
FIGURE 8 is a view employed in describing certain field aspects experienced within the structure of FIGURE 7.

An enlarged representation of a small section of one of the helices is shown in FIGURE 8 for one instantaneous voltage condition along the line. The small arrows above the helix represent the direction of force that the field of the helix exerts on an electron traversing a path parallel and close to the helix. The angular change of the force arrows viewed from left to right in the drawing denotes that the field pattern produces a rotating force upon electrons moving along beam path 10 with a velocity larger or smaller than that of the wave on the helix. It It is also apparent that the field has both transverse and longitudinal components and therefore effects coupling to the beam to impress the signal modulation thereon.

Figure 9:
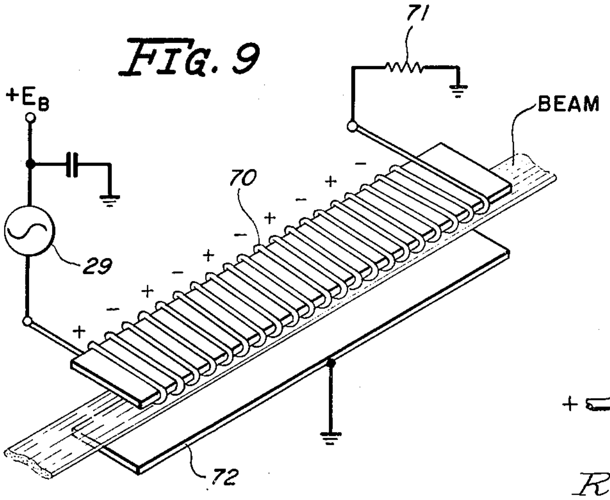
FIGURE 9 represents a modified modulation expander for use in a crossed-field type of parametric amplifier.

As previously mentioned, if the quadrupole axis is arranged to be coincident with the direction of the magnetic field, both coordinates of the non-homogeneous field may be utilized in the modulation expander for amplifying the signal carried by the beam. This inventive concept becomes of specific interest when it is desired to utilize a pump signal wave of finite phase velocity in the expander section. The arithmetical conditions for this arrangement, which concern the relation between pump frequency, cyclotron frequency, electron velocity and pump signal phase velocity, have been described in the aforementioned Adler application. Such an arrangement, according to the invention, may be provided by the use of a pump signal wave transmission line 70 disposed on one side of the electron beam and extending parallel to the beam path as represented in FIGURE 9. The pump signal source 29 is connected to one end of this line and the opposite end is have proper terminations at both ends to avoid reflections. Since it is necessary to preserve the crossed field condition within the expander, a D.C. potential is applied between the helical transmission line section and the companion plate 72 arranged in parallel with the line on the opposite side of the beam path and maintained at ground or some other reference potential such as that of the cathode.

The enlarged view of FIGURE 8, employed in explaining the derivation of a rotating force field acting upon electrons moving along beam path 10, applies equally well to the structure of FIGURE 9. Manifestly, the force fields established by line section 70 become weaker at increasing distances from the line so that, by their very nature, these fields are non-homogeneous. As a consequence, the application of the pump signal to line section 70 effectively develops a plurality of revolving quadrupole field components the axes of which are coincident with the direction of the magnetic field of the amplifier. This is apparent when it is recognized that the representation of the X Y Z axes of FIGURE 4 applies, as well, to the structure of FIGURE 9. The pumping field has components in both the Y and Z directions and each contributes to increasing the amplitude of the cycloidal electron motion as required to amplify the signal carried on the beam.

It will be recognized in relation to FIGURES 7 and 9 that helical transmission line sections are employed in the first instance to effect coupling to the beam and in the latter to accomplish modulation expansion. When the transmission line is employed as a coupler, use is made of the revolving field on the side of the helix facing the beam path. It is necessary, however, to arrange the electron and phase velocities taking into consideration the Doppler effect encountered so that a moving electron on the beam sees a field rotating at the cyclotron frequency. In its use as an expander, the line section again effectively develops rotating quadrupole field components and use is made of the non-homogeneous character of the field in accomplishing modulation expansion. This requires a selection of electron and phase velocities so that an electron moving on the beam sees a force field having a frequency of twice the cyclotron frequency.

The various structures described have the advantage that the homogeneous magnetic field may be very easily attained through the use of a permanent magnet. Obviously, great field strengths may be readily established as required for amplification of high frequency signals.

While particular embodiments of the present invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A crossed-field type of parametric amplifier comprising: means for establishing a homogeneous unidirectional magnetic field across a predetermined beam path; means for establishing a homogeneous unidirectional electric field across said path perpendicularly to said magnetic field to establish in conjunction therewith a crossed-field condition along said path, said last-named means comprising an electrode system having first, second and third portions disposed at first, second and third successive spaced positions along said path; means for directing an electron beam along said path; means including said first portion of said electrode system for coupling a signal source to said beam to develop cycloidal electron motion in said beam representing an applied signal; modulation expansion means including said second portion of said electrode system for subjecting the electrons of said beam to a time-variable non-homogeneous field, the intensity of which varies substantially linearly with distance from said path, to increase the amplitude of their cycloidal motion; means including said third portion of said electrode system for extracting from said beam energy corresponding to said signal; electrode means disposed along said path and positioned between and bridging each of said first and second and second and third portions; and means for biasing said electrode means to establish a uniform electric field across said path from each one of said portions to the next.

2. A crossed-field type of parametric amplifier comprising: means for directing an electron beam along a predetermined path; means for developing a homogeneous unidirectional magnetic field across said path to establish cyclotron resonance in said beam; means for establishing a homogeneous unidirectional electric field across said path perpendicularly to said magnetic field to establish in conjunction therewith a crossed-field condition along said path; a source of a signal having a frequency corresponding to the cyclotron resonance frequency of said beam; input coupling means disposed at one position along said path for coupling said source to said beam to develop cycloidal electron motion in said beam representing said signal; modulation expansion means disposed at a second position along said path for subjecting the electrons of said beam to a time-variable non-homogeneous field, the intensity of which varies substantially linearly with distance from said path, to increase the amplitude of their cycloidal motion; and output coupling means disposed at a third position along said path, beyond said modulation expansion means, for extracting from said beam energy corresponding to said signal; at least one of said coupling means comprising a pair of deflection plates, having an infinite phase velocity at the frequency of said signal, spaced on opposite sides of said path.

3. A crossed-field type of parametric amplifier comprising: means for directing an electron beam along a predetermined path; means for developing a homogeneous unidirectional magnetic field across said path to establish cyclotron resonance in said beam; a source of signal to be amplified having a frequency related to the cyclotron-resonance frequency of said beam to provide a fast signal wave on said beam having a given finite phase velocity; input coupling means disposed at one position along said path for coupling said source to said beam to develop thereon a fast electron wave in the form of cycloidal electron motion representing an applied signal; modulation expansion means disposed at a second position along said path for subjecting the electrons of said beam to a time-variable non-homogeneous field, the intensity of which varies substantially linearly with distance from said path, to increase the amplitude of their cycloidal motion; and output coupling means disposed at a third position along said path, beyond said modulation expansion means, for extracting from said beam energy corresponding to said signal; at least one of said coupling means comprising a pair of helical transmission line sections spaced on opposite sides of said path and having a propagation velocity substantially equal to said phase velocity.

4. A crossed-field type of parametric amplifier comprising: means for directing an electron beam along a predetermined path; means for developing a homogeneous unidirectional magnetic field across said path to establish cyclotron resonance in said beam; a source of signal to be amplified having a frequency related to the cyclotron-resonance frequency of said beam to provide a fast signal wave on said beam having a given finite phase velocity; input coupling means disposed at one position along said path for coupling said source to said beam to develop thereon a fast electron wave in the form of cycloidal electron motion representing an applied signal; modulation expansion means disposed at a second position along said path for subjecting the electrons of said beam to a time-variable non-homogeneous field, the intensity of which varies substantially linearly with distance from said path, to increase the amplitude of their cycloidal motion; and output coupling means disposed at a third position along said path, beyond said modulation expansion means, for extracting from said beam energy corresponding to said signal; at least one of said coupling means comprising a longitudinal helix having a propagation velocity substantially equal to said phase velocity and disposed on one side of said path to develop a rotating electric field for coupling to said beam.

5. A crossed-field type of parametric amplifier comprising: means for directing an electron beam along a predetermined path; means for establishing a homogeneous unidirectional magnetic field across said path; means for establishing a homogeneous unidirectional electric field across said path perpendicularly to said magnetic field to establish in conjunction therewith a crossed-field condition along said path; means disposed at one position along said path for coupling a signal source to said beam to develop cycloidal electron motion in said beam representing an applied signal; modulation expansion means, including a quadrupole electrode structure disposed at a second position along said path, for subjecting the electrons of said beam to a time-variable non-homogeneous field, the intensity of which varies substantially linearly with distance from said path, to increase the amplitude of their cycloidal motion; and means disposed at a third position along said path, beyond said modulation expansion means, for extracting from said beam energy corresponding to said signal.

6. A crossed-field type of parametric amplifier comprising: means for directing an electron beam along a predetermined path, means for establishing a homogeneous unidirectional magnetic field across said path; means for establishing a homogeneous unidirectional electric field across said path perpendicularly to said magnetic field to establish in conjunction therewith a crossed-field condition along said path; means disposed at one position along said path for coupling a signal source to said beam to develop cycloidal electron motion in said beam representing an applied signal; modulation expansion means, including a quadrupole electrode structure disposed at a second position coaxially along said path for subjecting the electrons of said beam to a time-variable non-homogeneous field, the intensity of which varies substantially linearly with distance from said path, to increase the amplitude of their cycloidal motion; and means disposed at a third position along said path, beyond said modulation expansion means, for extracting from said beam energy corresponding to said signal.

7. A crossed-field type of parametric amplifier comprising: means for establishing a homogeneous unidirectional magnetic field across a predetermined beam path; means for establishing a homogeneous unidirectional electric field across said path perpendicularly to said magnetic field to establish in conjunction therewith a crossed-field condition along said path, said last-named means comprising an electrode system having first, second and third portions disposed at first, second and third successive positions along said path; means for directing an electron beam along said path; means including said first portion of said electrode system for coupling a signal source to said beam to develop cycloidal electron motion in said beam representing an applied signal; modulation expansion means, comprising a quadrupole electrode structure including said second portion of said electrode system, for subjecting the electrons of said beam to a time-variable non-homogeneous field, the intensity of which varies substantially linearly with distance from said path, to increase the amplitude of their cycloidal motion; and means including said third portion of said electrode system for extracting from said beam energy corresponding to said signal.

8. In a crossed-field type of parametric amplifier characterized by a beam traversing a reference path and having cycloidal electron motion representing a signal to be amplified, a modulation expander comprising: means for establishing a homogeneous unidirectional magnetic field across said reference path; means for establishing a homogeneous unidirectional electric field across said path perpendicularly to said magnetic field to establish in conjunction therewith a crossed-field condition along said path; and a quadrupole electrode structure for developing a time-variable non-homogeneous field, the intensity of which varies substantially linearly with distance from said path, in the plane of said cycloidal motion to increase the amplitude of motion of the electrons of said beam.

9. A crossed-field type of parametric amplifier comprising: means for directing an electron beam along a predetermined path; means for establishing a homogeneous unidirectional magnetic field across said path; means for establishing a homogeneous unidirectional electric field across said path perpendicularly to said magnetic field to establish in conjunction therewith a crossed-field condition along said path; means disposed at one position along said path for coupling a signal source to said beam to develop cycloidal electron motion in said beam representing an applied signal; modulation expansion means disposed at a second position along said path for effectively developing a plurality of revolving field components which revolve about an axis coincident with the direction of said magnetic field, an intensity which varies substantially linearly with distance from said path and which subject the electrons of said beam to a time-variable non-homogeneous field to increase the amplitude of their cycloidal motion; and means disposed at a third position along said path, beyond said modulation expansion means, for extracting from said beam energy corresponding to said signal.

10. A crossed-field type of parametric amplifier comprising: means for directing an electron beam along a predetermined path; means for establishing a homogeneous unidirectional magnetic field across said path; means for establishing a homogeneous unidirectional electric field across said path perpendicularly to said magnetic field to establish in conjunction therewith a crossed-field condition along said path; means disposed at one position along said path for coupling a signal source to said beam to develop cycloidal electron motion in said beam representing an applied signal; modulation expansion means, including at least one transmission line section disposed at a second position along said path and substantially parallel thereto, for effectively developing a plurality of revolving field components which revolve about an axis coincident with the direction of said magnetic field and which subject the electrons of said beam to a time-variable non-homogeneous field, the intensity of which varies substantially linearly with distance from said path, to increase the amplitude of their cycloidal motion; and means disposed at a third position along said path, beyond said modulation expansion means, for extracting from said beam energy corresponding to said signal.

11. A crossed-field type of parametric amplifier comprising:

means for directing an electron beam along a predetermined path;

means for establishing a homogeneous unidirectional magnetic field across said path;

means for establishing a homogeneous unidirectional electric field across said path perpendicularly to said magnetic field to establish in conjunction therewith a crossed-field condition along said path;

means disposed at one position along said path for coupling a signal source to said beam to develop periodic cycloidal electron motion in said beam representing an applied signal, said cycloidal motion having a cyclotron wave component lying in a plane including said path;

modulation expansion means disposed at a second position along said path for subjecting electrons of said beam to a periodic inhomogeneous field the inhomogeneous change of which is in a direction substantially perpendicular to said path and the periodicity of which has a phase relationship to said cyclotron wave component to enable the delivery of energy thereto in proportion to the amplitude of said component;

and means disposed at a third position along said path, beyond said modulation expansion means, for extracting from said beam energy corresponding to said signal.

References Cited by the Examiner

UNITED STATES PATENTS 2,794,936 6/1957 Huber ............ 315—39.3

OTHER REFERENCES

Adler: "Proceedings of the IRE," June 1958, pages 1300–1301.

De Grasse et al.: "1957 IRE WESCON Convention Record—Part 3," pages 163–168.

Suhl: "Physical Review," April 15, 1957, pages 384–385.

ROY LAKE, *Primary Examiner.*

ELI J. SAX, BENNETT G. MILLER, *Examiners.*